Patented Aug. 22, 1933

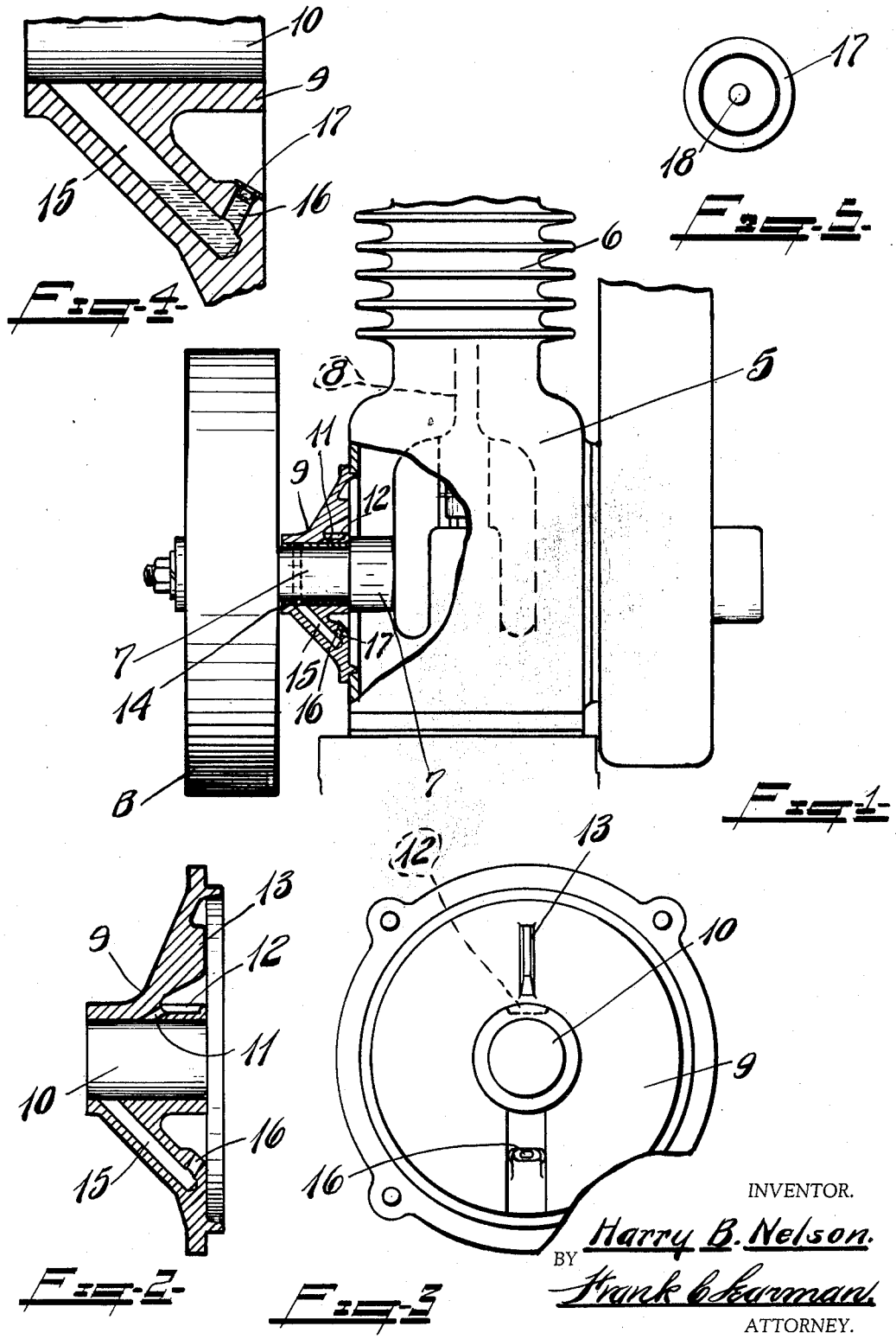

1,923,387

UNITED STATES PATENT OFFICE 1,923,387

INTERNAL COMBUSTION ENGINE

Harry B. Nelson, Saginaw, Mich., assignor to Nelson Brothers Company, Saginaw, Mich., a Corporation of Michigan Application July 23, 1932. Serial No. 624,183

5 Claims. (Cl. 184—6)

This invention relates to internal combustion engines, and more particularly to the crank shaft bearings and the means for lubrication thereof. In internal combustion engines the pressure pulsations within the crank case, due to the movement of the piston, force jets of air through the clearance space of the crank shaft bearings which forces the oil out of the crank case, with the subsequent damage to surrounding mechanism and the waste of the oil supply prematurely.

One of the prime objects of the invention is to provide means for trapping the oil which is forced outwardly by reason of these pressure pulsations, and provide a seal which will not be affected by said pulsations, so that the oil collected by the bearing groove may be continuously returned to the crank case.

Another object is to provide simple and practical means for returning the oil which is forced outwardly through the bearing clearances to the crank case, so that there will be no wastage, and for effectively sealing said oil duct or passage.

A more specific object of the invention resides in the provision of a return channel or duct so formed that the returning oil forms a seal, which seal is not affected by the pulsations of pressure within the crank case, but which nevertheless permits the excess oil to be returned.

With the above and other objects in view, the invention consists in the combination and arrangement of parts, hereinafter more fully described, illustrated in the accompanying drawing, and particularly pointed out in the appended claims, it being understood that changes may be made in the form, size, proportion, and minor details of construction, without departing from the spirit, or sacrificing any of the advantages of the invention.

In the drawing—

Fig. 1 is a fragmentary side view of a single cylinder internal combustion engine, with parts broken away and in section to illustrate the invention.

Fig. 2 is an enlarged sectional side view showing one of the crank case side plates, and illustrating the overflow passage therein.

Fig. 3 is a fragmentary end view of the crank case side plate.

Fig. 4 is an enlarged fragmentary sectional detail illustrating the seal.

Fig. 5 is a plan view of the duct cap.

Referring now more particularly to the accompanying drawing in which I have shown one embodiment of my invention, the numeral 5 represents the crank case of a single cylinder internal combustion engine, having a cylinder 6 in which a piston (not shown) is mounted, and which is connected to a crank shaft 7 by means of a connecting rod 8 as usual. Side plates 9 are secured to the sides of the crank case, and bearings 10 are provided therein, the crank shaft 7 being journaled in said bearings, and a flywheel "B" is mounted on said shaft as usual.

The crank case is adapted to be filled with oil or other lubricant, which is conducted to the bearings 10 in the conventional manner, and enters the clearance between its bore and the shaft through the inlet passage 11, which communicates with the recess 12 provided as shown, a drip rib 13 being formed on said flange directly above said recess.

An annular groove 14 is formed in the outer end of the bearing in communication with its bore, and this groove communicates with a return channel or duct 15 which leads diagonally to return the oil from the bearing groove 14 to the crank case, the inner end of the duct 15 being closed, and a substantially vertically disposed duct or passage 16 communicates therewith, a metal cap 17 being fitted in said duct, and a centrally disposed opening 18 is provided in said cap, to permit the overflow of oil, the lower end of the duct 15 and the duct 16 forming a trap in which the returning oil forms a seal as clearly shown in Fig. 4 of the drawing.

In operation the device is simple and practical. When the engine is operating, the pressure pulsations within the crank case force the oil outwardly through the bearing clearances to the annular groove 14, the excess oil entering said groove, thence flowing into the return duct 15, thence overflowing through the opening 18 into the crank case, the oil retained in the ducts 15 and 16 forming an effective seal at all times, and this seal is not affected by the pressure within the crank case caused by the downstroke of the engine piston, nor is it affected by the suction caused by the upstroke thereof, as the area of the opening 18 is considerably smaller than the area of the return duct 15; consequently, the pulsations do not affect the seal, and while in the present instance I have shown a metal cap fitted in said duct, it will be readily understood that any other desirable means may be used for limiting the size of said opening.

From the foregoing description it will be obvious that I have perfected a very simple, practical, and economical means for preventing oil being blown out of the bearings of internal combustion engines, and for returning excess oil from the outer portion of the bearings to the engine crank case.

What I claim is:

1. In an internal combustion engine including a crank case, a crank shaft, a bearing for the shaft, means for preventing lubricant from being forced out through the outer end of said bearing, and including means for returning lubricant from the outer end of the bearing to the crank case, said means forming a trap in which the returning lubricant forms a seal.

2. In combination with the crank case of an internal combustion engine, a crank shaft, a bearing for the shaft and adapted to receive oil from the crank case, a reciprocating piston producing pressure pulsations within the crank case, means for preventing said pressure pulsations from forcing oil out through the outer end of the bearing, and including a duct between the outer end of the bearing and the crank case for returning oil from the bearing to the crank case, the lower end of said duct being shaped to form a liquid seal.

3. In combination with a closed chamber adapted to contain a lubricant and subject to pressure pulsations, a bearing communicating with said chamber, a shaft journaled in the bearing, said bearing being lubricated from said lubricant chamber, and means for preventing the pressure within the chamber from forcing the lubricant out through the outer end of the bearing, including means for returning the lubricant from the outer portion of the bearing to the chamber, said means being shaped to form a liquid seal which permits excess lubricant overflowing into said chamber.

4. In combination with the crank case, an internal combustion engine having a piston and adapted to contain a lubricant, a shaft, a bearing mounted in the wall of the crank case and in which the shaft is journaled, and in which the clearance between the bearing bore and the shaft is in communication with the interior of the crank case, means for preventing pressure within the crank case from forcing lubricant out through the outer end of the bearing, and comprising a diagonally disposed return duct communicating with the bearing, and a vertically disposed duct communicating with the diagonally disposed duct and the crank case.

5. In combination with the crank case of an internal combustion engine in which pressure pulsations are produced by the piston of the engine, a shaft, a bearing for the shaft communicating with the interior of the crank case, said bearing being supplied with lubricant from the crank case and provided with a collector groove in its outer end portion, and a lubricant return passage communicating the collector groove with the crank case, and shaped to form a trap in which the returning lubricant forms a seal, and means for limiting the area of the inner end of said return passage.

HARRY B. NELSON.